(12) United States Patent
Wraith et al.

(10) Patent No.: US 11,511,679 B2
(45) Date of Patent: Nov. 29, 2022

(54) ACCESSORY MOUNTING TRACK

(71) Applicant: Ford Global Technologies, LLC, Dearborn, MI (US)

(72) Inventors: Paul Jonathan Alexander Wraith, West Bloomfield, MI (US); Robert J. Gelardi, Plymouth, MI (US); Ryan A. Olsson, Farmington Hills, MI (US); William James Mangan, Ypsilanti, MI (US); John Jeffrey Pfeiffer, Saline, MI (US); Mario Adams-Campos, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 109 days.

(21) Appl. No.: 17/154,679

(22) Filed: Jan. 21, 2021

(65) Prior Publication Data
US 2022/0227305 A1    Jul. 21, 2022

(51) Int. Cl.
*B60R 11/02* (2006.01)
*B60R 11/00* (2006.01)

(52) U.S. Cl.
CPC ....... *B60R 11/02* (2013.01); *B60R 2011/0005* (2013.01); *B60R 2011/0007* (2013.01); *B60R 2011/0042* (2013.01); *B60R 2011/0084* (2013.01)

(58) Field of Classification Search
CPC . B60R 11/00; B60R 11/02; B60R 2011/0008; B60R 2011/0042; B60R 2011/005; B60R 2011/0084; B60R 2011/0007
See application file for complete search history.

(56) References Cited

U.S. PATENT DOCUMENTS 4,118,101 A * 10/1978 Teramachi ............ F16C 29/008
                                                         108/143
5,244,283 A *  9/1993 Morita .................. F16C 29/008
                                                         384/44

(Continued)

FOREIGN PATENT DOCUMENTS

DE         19633163        2/1998
DE         19909732        9/2000
(Continued)

*Primary Examiner* — Tan Le
(74) *Attorney, Agent, or Firm* — Vichit Chea; Price Heneveld LLP

(57) ABSTRACT

An accessory mounting track includes a forward edge, a rearward edge, an upper surface, a lower surface, a first end region with a first end, a second end region with a second end, and an intermediate region positioned between the first and second end regions. A cross-section of the intermediate region includes an angular portion positioned on either side of a planar portion. The planar portion and the angular portions are delineated by an inflection point at a junction between the planar portion and each of the angled portions. A distance between the upper surface and the lower surface at the angular portions decreases as a distance from a centerline of the intermediate region increases. A distance between the forward edge and the rearward edge at the first and second end regions increases as a distance from the intermediate region increases.

20 Claims, 12 Drawing Sheets

(56) References Cited

U.S. PATENT DOCUMENTS

| | | | | |
|---|---|---|---|---|
| 5,743,653 | A * | 4/1998 | Katoh | F16C 29/064 |
| | | | | 384/43 |
| 6,431,373 | B1 * | 8/2002 | Blick | B25H 3/003 |
| | | | | 206/378 |
| 6,637,605 | B2 * | 10/2003 | Ernst | B25H 3/003 |
| | | | | 206/378 |
| 7,097,082 | B2 | 8/2006 | Wallaker | |
| 9,056,587 | B2 | 6/2015 | Montgomery et al. | |
| 9,671,060 | B1 | 6/2017 | Cifers | |
| 9,828,073 | B1 | 11/2017 | Cifers, III | |
| 10,429,002 | B2 | 10/2019 | Carnevali | |
| 2005/0146116 | A1 | 7/2005 | Lindenman et al. | |
| 2005/0247653 | A1 * | 11/2005 | Brooks | A47F 5/0846 |
| | | | | 211/94.01 |
| 2006/0131088 | A1 | 6/2006 | Pawusch et al. | |
| 2014/0246468 | A1 * | 9/2014 | Montgomery | B60K 37/02 |
| | | | | 224/548 |

FOREIGN PATENT DOCUMENTS

| | | |
|---|---|---|
| DE | 102006045323 | 4/2008 |
| DE | 102008005306 | 7/2009 |
| DE | 102019202005 | 6/2020 |

* cited by examiner

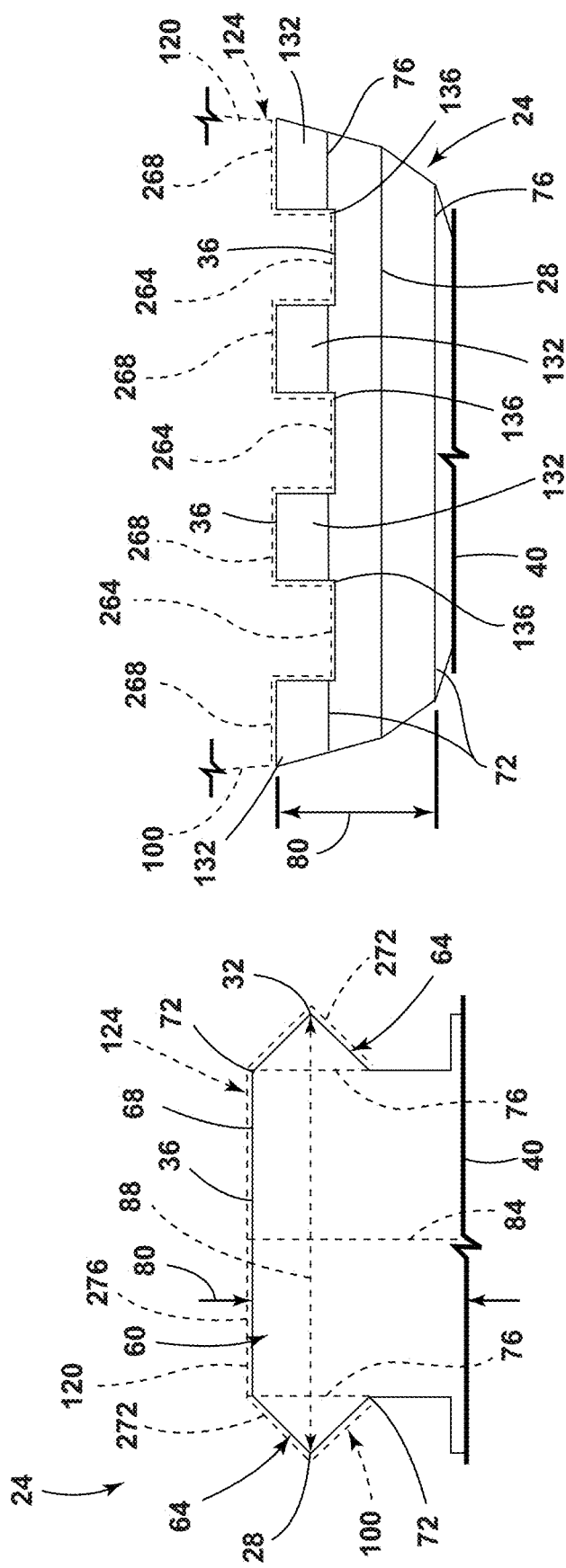

ACCESSORY MOUNTING TRACK

FIELD OF THE DISCLOSURE

The present disclosure generally relates to accessory mounting tracks. More specifically, the present disclosure relates to accessory mounting tracks that can be coupled to vehicles.

BACKGROUND OF THE INVENTION

Storage solutions for consumers are often provided within vehicles. However, available storage solutions for holding an item in a fixed location can be limited. Accordingly, the present disclosure seeks to provide consumers with addition storage solutions for holding items within a fixed location or region while maintaining a degree of adjustability of the location of the item.

SUMMARY OF THE INVENTION

According to a first aspect of the present invention, an accessory mounting track includes a forward edge, a rearward edge, an upper surface, a lower surface, a first end region with a first end, a second end region with a second end, and an intermediate region positioned between the first and second end regions. A cross-section of the intermediate region includes an angular portion positioned on either side of a planar portion. The planar portion and the angular portions are delineated by an inflection point at a junction between the planar portion and each of the angled portions. A distance between the upper surface and the lower surface at the angular portions decreases as a distance from a centerline of the intermediate region increases. A distance between the forward edge and the rearward edge at the first and second end regions increases as a distance from the intermediate region increases.

Embodiments of the first aspect of the invention can include any one or a combination of the following features:
  the intermediate region defines a series of apertures that receive a coupling member of a removable accessory;
  the coupling member receives an accessory fastener, wherein the accessory fastener is rotated about an axis thereof to retain the removable accessory in a given location along the intermediate region;
  rotation of the accessory fastener causes the coupling member to rotate from a first position to a second position;
  a protruding member that extends from the lower surface;
  the protruding member defines a fastener aperture therethrough;
  the fastener aperture receives a fastener, wherein the fastener engages with a support structure to retain the accessory mounting track to the support structure;
  a first standoff that extends from the lower surface within the first end region and a second standoff that extends from the lower surface within the second end region;
  a viewing direction of a removable accessory is non-parallel to the centerline of the intermediate region;
  the angular portions of the intermediate region prevent rotational motion of a removable accessory relative to the intermediate region;
  the forward edge within the first and second end regions extends beyond the forward edge within the intermediate region;
  upon coupling a removable accessory to the accessory mounting track, a mounting structure of the removable accessory is adjacent to the lower surface and a support surface to which the accessory mounting track is coupled;
  the intermediate region defines a series of ridges, wherein adjacent ridges define valleys therebetween; and
  upon coupling a removable accessory to the accessory mounting track, a mounting structure of the removable accessory is received within one or more of the valleys such that the mounting structure is retained by adjacent ones of the ridges that define the one or more valleys.

According to a second aspect of the present disclosure, an accessory mounting track includes a forward edge, a rearward edge, an upper surface, a lower surface, a protruding member that extends from the lower surface, a first end region with a first end, a first standoff that extends from the lower surface within the first end region, a second end region with a second end, a second standoff that extends from the lower surface within the second end region, and an intermediate region positioned between the first and second end regions. The protruding member defines a fastener aperture therethrough. The fastener aperture receives a fastener. The fastener engages with a support structure to retain the accessory mounting track to the support structure. A cross-section of the intermediate region includes an angular portion positioned on either side of a planar portion. The planar portion and the angular portions are delineated by an inflection point at a junction between the planar portion and each of the angled portions. A distance between the upper surface and the lower surface at the angular portions decreases as a distance from a centerline of the intermediate region increases. A distance between the forward edge and the rearward edge at the first and second end regions increases as a distance from the intermediate region increases. The forward edge within the first and second end regions extends beyond the forward edge within the intermediate region.

Embodiments of the second aspect of the present disclosure can include any one or a combination of the following features:
  the intermediate region defines a series of apertures that receive a coupling member of a removable accessory;
  the coupling member receives an accessory fastener, wherein the accessory fastener is rotated about an axis thereof to retain the removable accessory in a given location along the intermediate region;
  rotation of the accessory fastener causes the coupling member to rotate from a first position to a second position;
  a viewing direction of a removable accessory is non-parallel to the centerline of the intermediate region; and
  the intermediate region defines a series of ridges, wherein adjacent ridges define valleys therebetween.

These and other aspects, objects, and features of the present disclosure will be understood and appreciated by those skilled in the art upon studying the following specification, claims, and appended drawings.

BRIEF DESCRIPTION OF THE DRAWINGS

In the drawings.

FIG. 12A is a cross-sectional view of the intermediate region, taken at line XIIA-XIIA of FIG. 1, illustrating a planar portion and angular portions of the intermediate region, according to one example; and FIG. 12B is a rear view of the intermediate region of the accessory mounting track, illustrating ridges and valleys defined therein, according to one example.

DETAILED DESCRIPTION OF THE PREFERRED EMBODIMENTS

Figure 1:
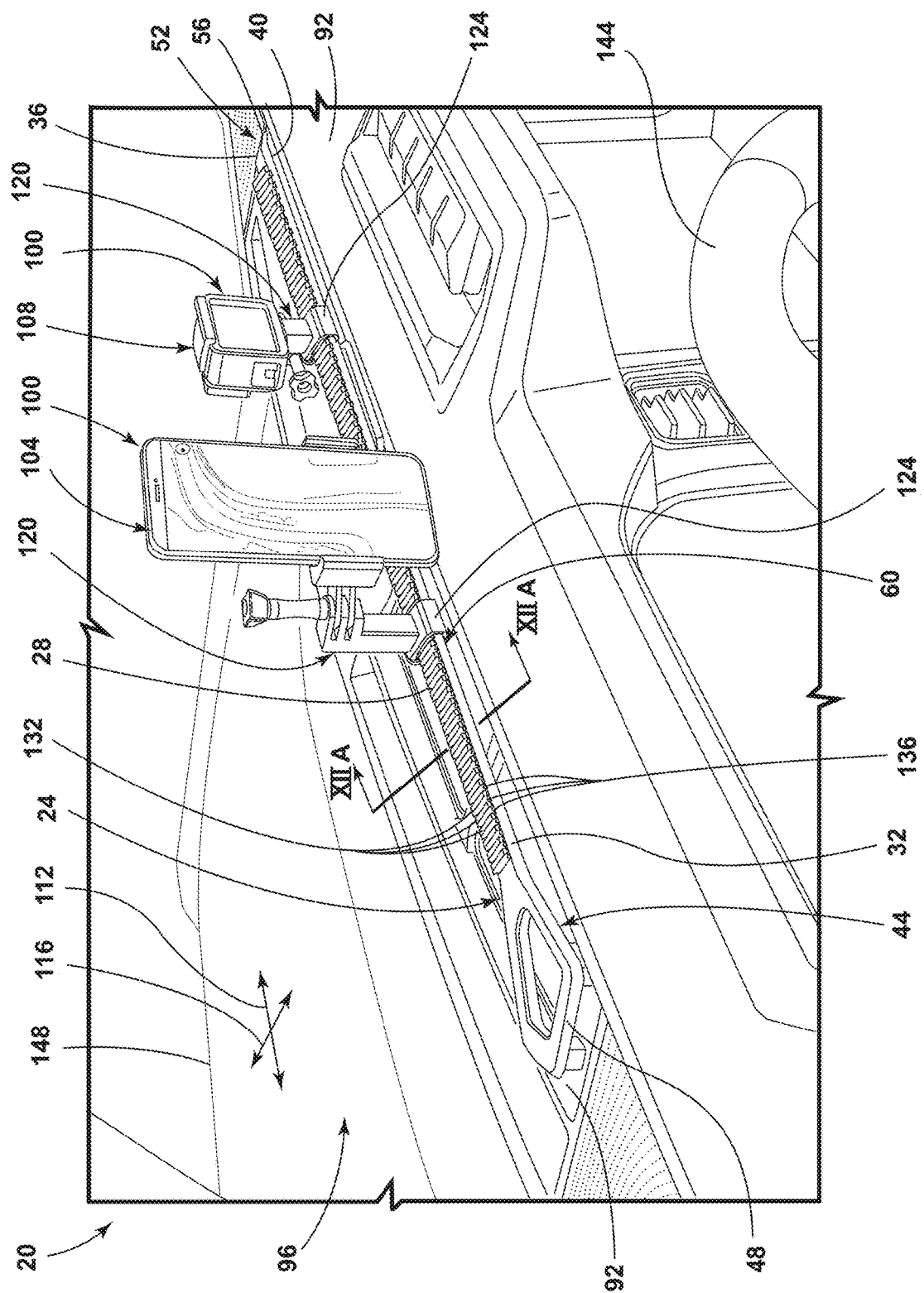
FIG. 1 is a side perspective view of a cabin of a vehicle, illustrating an accessory mounting track, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to an accessory mounting track. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-12B, reference numeral 20 generally designates a vehicle. In various examples, the vehicle 20 may be a motor vehicle. For example, the vehicle 20 may be a land-based vehicle (e.g., an automobile, a motorcycle, a train, etc.), an air-based vehicle (e.g., an airplane, a helicopter, etc.), and/or a water-based vehicle (e.g., a boat or other watercraft). While the vehicle 20 may be a motor vehicle, the present disclosure is not limited to internal combustion engines as a source of locomotive power for the vehicle 20. Rather, alternative sources may be utilized in providing locomotive power to the vehicle 20. For example, locomotive power may be provided to the vehicle 20 by electric motors, fuel cells, and/or petroleum-based fuel engines. The vehicle 20 can include an accessory mounting track 24. The accessory mounting track 24 can include a forward edge 28, a rearward edge 32, an upper surface 36, a lower surface 40, a first end region 44 that includes a first end 48, a second end region 52 that includes a second end 56, and an intermediate region 60 positioned between the first and second end regions 44, 52. A cross-section of the intermediate region 60 can include an angular portion 64 positioned on either side of a planar portion 68. The planar portion 68 and the angular portions 64 are delineated by an inflection point 72 at a junction 76 between the planar portion 68 and each of the angular portions 64. A distance 80 between the upper surface 36 and the lower surface 40 at the angular portions 64 can decrease as a distance from a centerline 84 of the intermediate region 60 increases. A distance 88 between the forward edge 28 and the rearward edge 32 at the first and second end regions 44, 52 can increase as a distance from the intermediate region 60 increases.

Referring again to FIGS. 1 and 2, the accessory mounting track 24 can be coupled to a presented surface 92 within a cabin 96 of the vehicle 20. The presented surface 92 may be any surface within the cabin 96 that is in a desirable or suitable location for an intended use of a removable accessory 100 (e.g., proximate to a window of the vehicle 20, proximate to a seating assembly of the vehicle 20, and so on). In various examples, the removable accessory 100 may be coupled to the intermediate region 60 of the accessory mounting track 24. In some examples, the removable accessory 100 may be coupled to the first end region 44 or the second end region 52. Accordingly, the first end region 44, the second end region 52, and/or the intermediate region 60 of the accessory mounting track 24 may be utilized for coupling one or more of the removable accessories 100 thereto. In the depicted example, the removable accessories 100 include a smart phone 104 and a mobile audio/visual recording device 108, each of which is independently coupled to the intermediate region 60. However, the present disclosure is not so limited. Rather, the removable accessory 100 can be any device or apparatus that a user desires to support, suspend, or otherwise secure in a given location within the cabin 96. In the depicted example, the accessory mounting track 24 extends along a lateral direction 112 of the vehicle 20. The lateral direction 112 may be defined as a direction that is angularly offset from a direction of travel of the vehicle 20. For example, the lateral direction 112 of the vehicle 20 may be offset from the direction of travel of the vehicle 20 by about ninety degrees (90°). A longitudinal direction 116 of the vehicle 20 may be defined as a direction that is parallel to the direction of travel of the vehicle 20. Alternatively, the longitudinal direction 116 may be defined as a direction that primarily extends in a fore-aft direction of the vehicle 20 (e.g., headlight to taillight).

Figure 2:
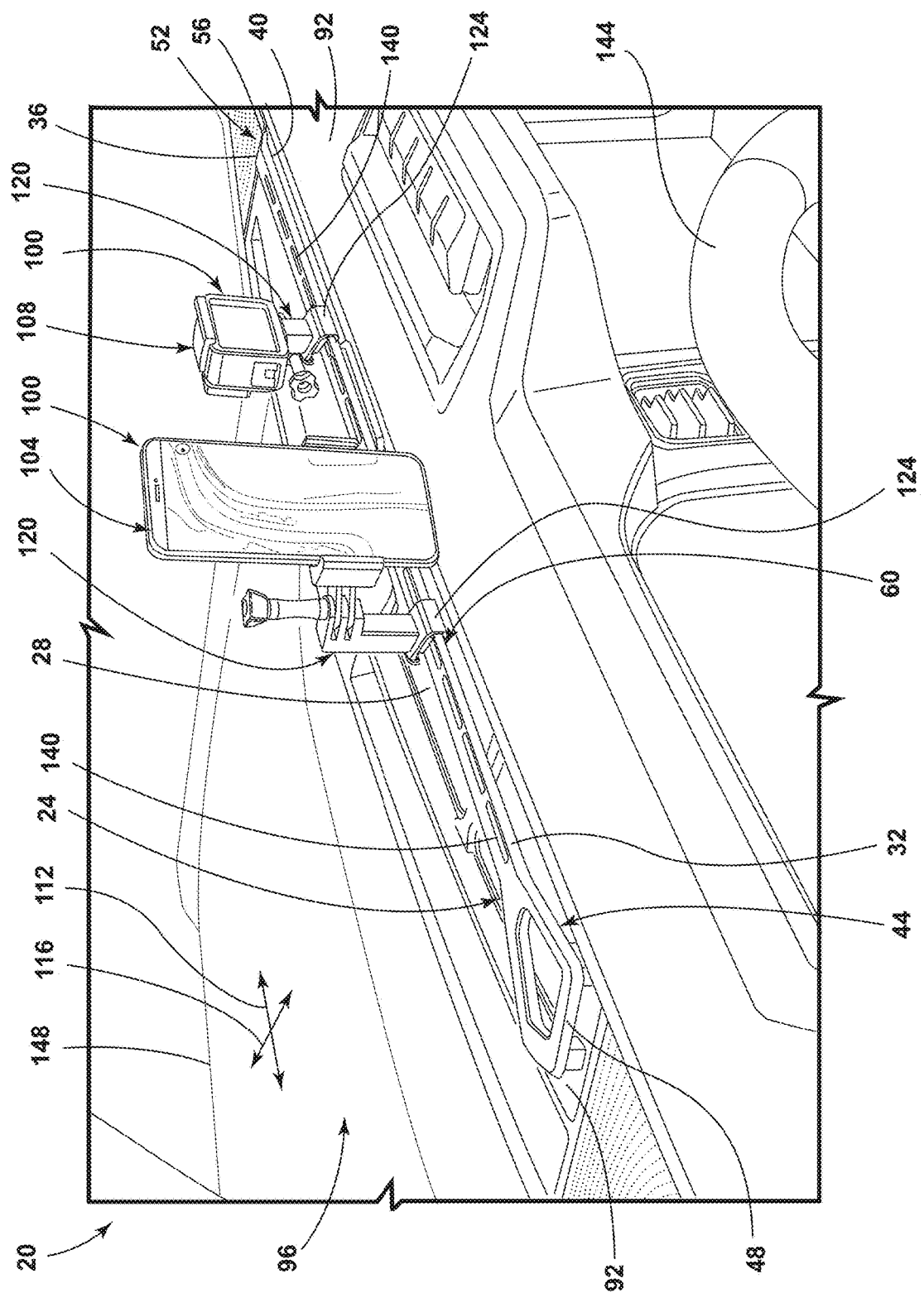
FIG. 2 is a side perspective view of the cabin of the vehicle, illustrating the accessory mounting track, according to another example.

Referring further to FIGS. 1 and 2, the removable accessory 100 may be coupled to the accessory mounting track 24 by a mounting structure 120. The mounting structure 120 can include a coupling member 124 (see FIGS. 1 and 11A-12B) that engages with the accessory mounting track 24. The coupling member 124 may be retained to the accessory mounting track 24 by one or more accessory fasteners 128 (e.g., see FIGS. 11A-11B). In various examples, the intermediate region 60 can define a series of ridges 132, with the series of ridges 132 defining valleys 136, as will be discussed further herein. Additionally or alternatively, the intermediate region 60 can define one or more apertures 140 (e.g., see FIGS. 4-5 and 11A-11B) that receive the coupling member 124 (see FIGS. 11A-11B) of the removable accessory 100. In the depicted example, a viewing angle of the removable accessory 100 is non-parallel to the centerline 84 (see FIGS. 4 and 12A) of the intermediate region 60. For example, with regard to the depicted smart phone 104, the viewing angle of the smart phone 104 may be oriented toward an operator of the vehicle 20 (e.g., angled toward an occupant positioned proximate to a steering wheel 144 of the vehicle 20). With regard to the depicted mobile audio/visual recording device 108, the viewing angle of the mobile audio/visual recording device 108 may be oriented along the longitudinal direction 116 of the vehicle 20 (e.g., toward a front 148 of the vehicle 20). Accordingly, in two specific non-limiting examples, the viewing angle may be defined as an angle at which a user of the removable accessory 100 views the removable accessory 100 and/or an angle at which the removable accessory 100 views or is oriented during normal use.

Figure 3A:
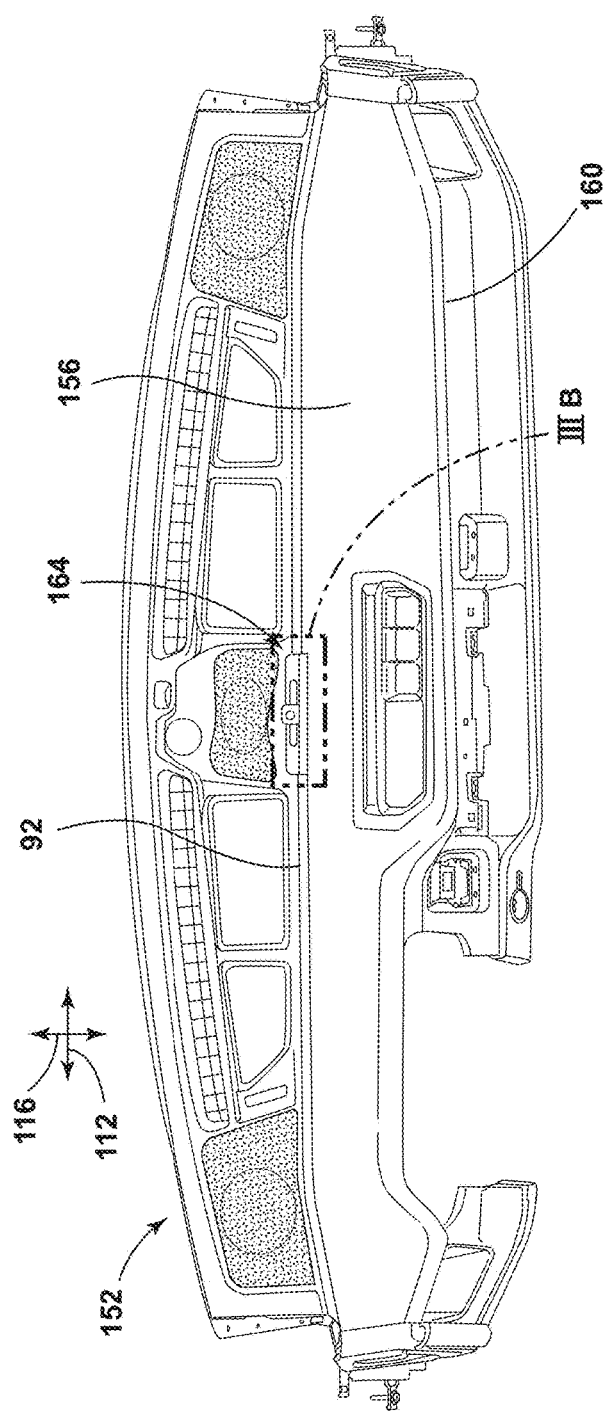
FIG. 3A is a top perspective view of an instrument panel of the vehicle, illustrating a top surface thereof, according to one example.
Figure 3B:
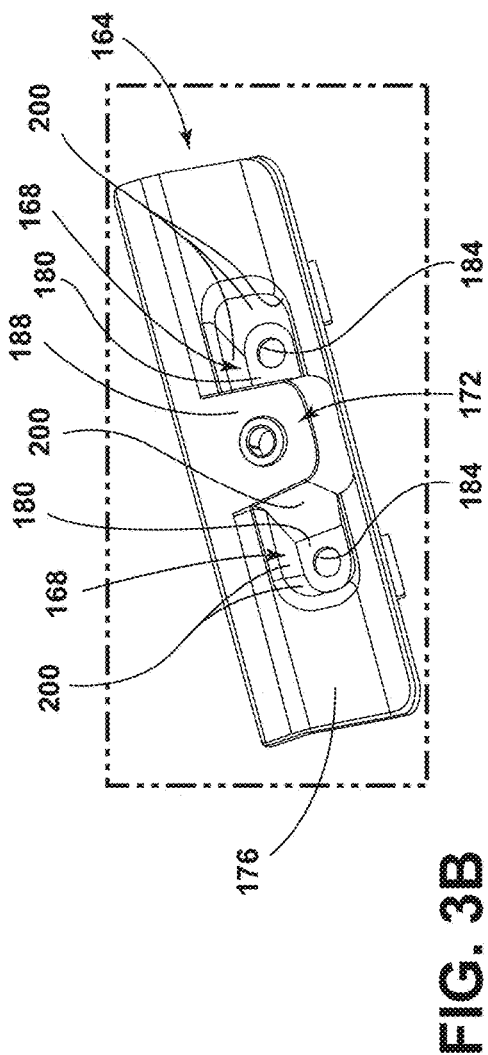
FIG. 3B is an expanded top perspective view, taken at region IIIB of FIG. 3A, of a support structure to which the accessory mounting track couples, according to one example.
Figure 4:
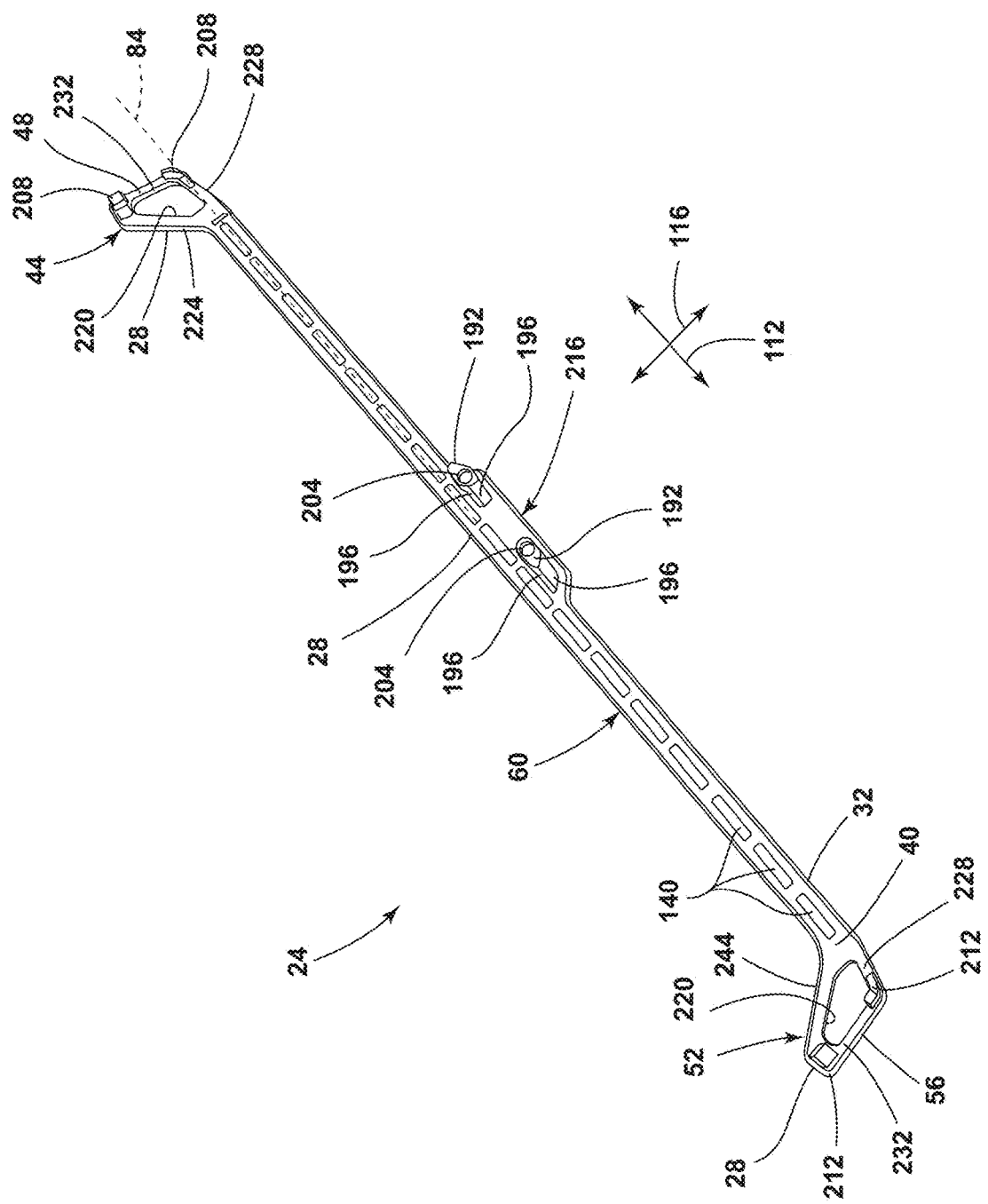
FIG. 4 is a rear perspective view of the accessory mounting track, according to one example.

Referring now to FIGS. 3A-4, a vehicle component that is configured to receive the accessory mounting track 24 is depicted according to one example. In the depicted example, the vehicle component that is configured to receive or otherwise couple with the accessory mounting track 24 is a dashboard or instrument panel 152 of the vehicle 20. The presented surface 92 of the vehicle component that receives or couples with the accessory mounting track 24 may be a top surface 156 and/or a rearward surface 160 of the instrument panel 152. The instrument panel 152 includes a support structure 164 that receives a portion of the accessory mounting track 24 to retain the accessory mounting track 24 to the vehicle component (e.g., the instrument panel 152). The support structure 164 may be an insert that is coupled to the instrument panel 152 such that the support structure 164 is integrated with the instrument panel 152. Alternatively, the support structure 164 may be unitarily formed with the instrument panel 152. In various examples, the term unitarily formed can include examples where the support structure 164 and the instrument panel 152 are formed as a single structure or component rather than discrete or individual components that are coupled to one another in a removable fashion.

Referring again to FIGS. 3A-4, the support structure 164 can define recessed portions 168 that are positioned on either side of a raised portion 172. The recessed portions 168 are recessed or otherwise depressed relative to a surface 176 of the support structure 164. Accordingly, a bottom surface 180 of the recessed portions 168 may be positioned lower than the surface 176 of the support structure 164. The bottom surface 180 of the support structure 164 defines an aperture 184. The raised portion 172 can extend vertically upward from the surface 176 such that a top surface 188 of the raised portion 172 is vertically above the surface 176 of the support structure 164. The sizing and positioning of the recessed portions 168 and the raised portion 172 of the support structure 164 can be configured to receive one or more protruding members 192 of the accessory mounting track 24. The protruding member 192 extends from the lower surface 40 of the accessory mounting track 24. One of the protruding members 192 may be provided for each of the recessed portions 168 of the support structure 164. Accordingly, in the depicted example one of the protruding members 192 is received in each of the recessed portions 168 such that the protruding members 192 flank either side of the raised portion 172 of the support structure 164 when the accessory mounting track 24 is coupled to the instrument panel 152. Exterior surfaces 196 of the protruding members 192 engage with interior surfaces 200 of the recessed portions 168. In such an arrangement, the interaction between the recessed portions 168, the raised portion 172, and the protruding members 192 provide a degree of retention of the accessory mounting track 24 along a plane defined by the surface 176 of the support structure 164.

Referring further to FIGS. 3A-4, each of the protruding members 192 defines a fastener aperture 204 therethrough. The fastener aperture 204 of the protruding member 192 may correspond with the aperture 184 in the bottom surface 180 of a corresponding one of the recessed portions 168 and the support structure 164. Accordingly, the fastener aperture 204 can receive a fastener that can be utilized to further retain the accessory mounting track 24 to the support structure 164 and/or the instrument panel 152. In various examples, the aperture 184 and the bottom surface 180 of the recessed portion 168 may be provided with threads cut into an interior surface of the aperture 184 such that the fastener utilized to couple the accessory mounting track 24 to the support structure 164 may engage the threads defined by or disposed upon the interior surface of the aperture 184 (e.g., with spreads provided on an exterior surface of the fastener). In such an arrangement, as the fastener is inserted through the fastener aperture 204 and threaded into the aperture 184, a compressive force may be provided to the accessory mounting track 24 by continued tightening of the fastener and corresponding gradual insertion of the fastener to the aperture 184. The compressive force may be applied to the accessory mounting track 24 as a result of a decrease in a distance between a head of the fastener and the surface 176 of the support structure 164. The fastening of the accessory mounting track 24 to the support structure 164 combined with the interference to lateral and/or longitudinal movement of the accessory mounting track 24 relative to the support structure 164 that is provided by the interaction between the recessed portions 168 and the protruding members 192 can provide sufficient retention forces to prevent the accessory mounting track 24 from becoming uncoupled, dislodged, or otherwise removed from the presented surface 92. The first end region 44 includes one or more first standoffs 208 that extend from the lower surface 40 of the first end region 44. Similarly, the second end region 52 can be provided with one or more second standoffs 212 that extend from the lower surface 40 of the accessory mounting track 24.

Figure 5:
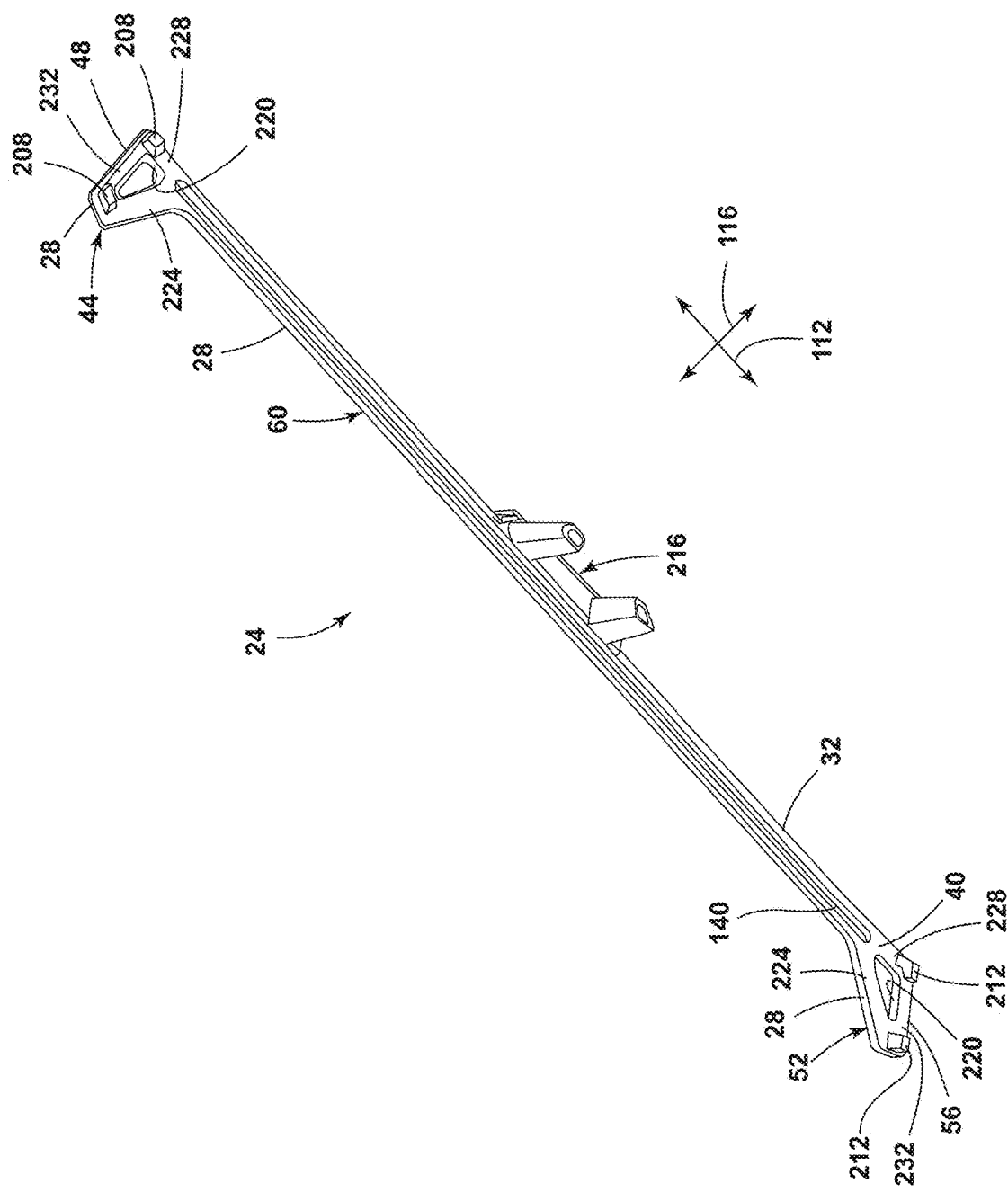
FIG. 5 is a rear perspective view of the accessory mounting track, according to one example.

Referring to FIGS. 4-5, the intermediate region 60 defines one or more of the apertures 140. The one or more apertures 140 may be arranged as a series of apertures 140 defined by the intermediate region 60 with adjacent ones of the apertures 140 being separated by portions of the intermediate region 60. In some examples, the one or more apertures 140 that are defined by the intermediate region 60 may be a single elongate aperture that extends from the first end region 44 to the second end region 52 of the accessory mounting track 24 (e.g., see FIG. 5). Regardless of the number of apertures 140 provided in the intermediate region 60, a compressive force provided by an interaction between the mounting structure 120, the coupling member 124, the accessory fastener 128, and/or the accessory mounting track 24 may be sufficient to retain the removable accessory 100 to the accessory mounting track 24 in a given location along the intermediate region 60. In various examples, the forward edge 28 of the accessory mounting track 24 within the first and second end regions 44, 52 may extend beyond the forward edge 28 of the accessory mounting track 24 within the intermediate region 60. Said another way, a distance between the forward edge 28 and the rearward edge 32 of the accessory mounting track 24 may vary dependent upon a position along the accessory mounting track 24 in the lateral direction 112. By providing a greater distance between the forward edge 28 and the rearward edge 32 within the first and second end regions 44, 52, increased stability may be provided to the accessory mounting track 24 against unintentional rotation in the lateral direction 112 and/or the longitudinal direction 116. The unintentional rotation that may be prevented by the dimensions of the first and second end regions 44, 52 may result from a weight of the removable accessory 100 and/or external forces experienced as a result of maneuvering the vehicle 20.

Referring again to FIGS. 4-5, a central portion 216 of the intermediate region 60 may be provided with a greater distance between the forward edge 28 and the rearward edge 32 of the accessory mounting track 24. Such an arrangement of the central portion 216 may provide additional stability to the accessory mounting track 24 with regard to preventing unintentional rotational motion of the accessory mounting track 24 in the lateral direction 112 and/or the longitudinal direction 116. Additionally, such a configuration of the central portion 216 of the intermediate region 60 can enable providing the protruding members 192 as offset from the centerline 84 of the intermediate region 60. By so positioning the protruding members 192, it is possible to couple one of the removable accessories 100 to the intermediate region 60 within the central portion 216 without interfering with the coupling of the accessory mounting track 24 to the vehicle 20. In some examples, the first and second end regions 44, 52 may define end region apertures 220. The end region apertures 220 may be utilized by a user in positioning the accessory mounting track 24 within the vehicle 20. In some examples, the end region apertures 220 may be utilized as a way to provide additional mounting locations along the accessory mounting track 24. For example, the end region apertures 220 may be defined by a first leg 224, a second leg 228, and a third leg 232 of the corresponding first end region 44 or second end region 52. In the depicted examples, the first leg 224 and the second leg 228 join at the intermediate region 60 and the third leg 232 extends between the first and second legs 224, 228 at an end of the first and second legs 224, 228 that is distal from the intermediate region 60. It is contemplated that the first leg 224, the second leg 228, and/or the third leg 232 may be provided with the ridges 132 that define the valleys 136 and/or be provided with the apertures 140 such that the first leg 224, the second leg 228, and/or the third leg 232 may be capable of receiving one of the removable accessories 100. While the depicted views of the accessory mounting track 24 in FIGS. 4 and 5 does not show the upper surface 36 of the accessory mounting track 24, it is contemplated that the accessory mounting track 24 may be provided with the ridges 132 that define the valleys 136, as well as the apertures 140 such that the accessory mounting track 24 may be capable of receiving a variety of coupling members 124 of mounting structures 120 that are associated with removable accessories 100. For example, the ridges 132, the valleys 136, and the apertures 140 may be unitarily formed in the accessory mounting track 24 such that the ridges 132 and valleys 136 surround a perimeter of each of the apertures 140. Alternatively, sections of ridges 132 and valleys 136 may be coupled to apertures 140 in an adapter-like manner (e.g., see FIG. 11A).

Figures 6A, 6B:
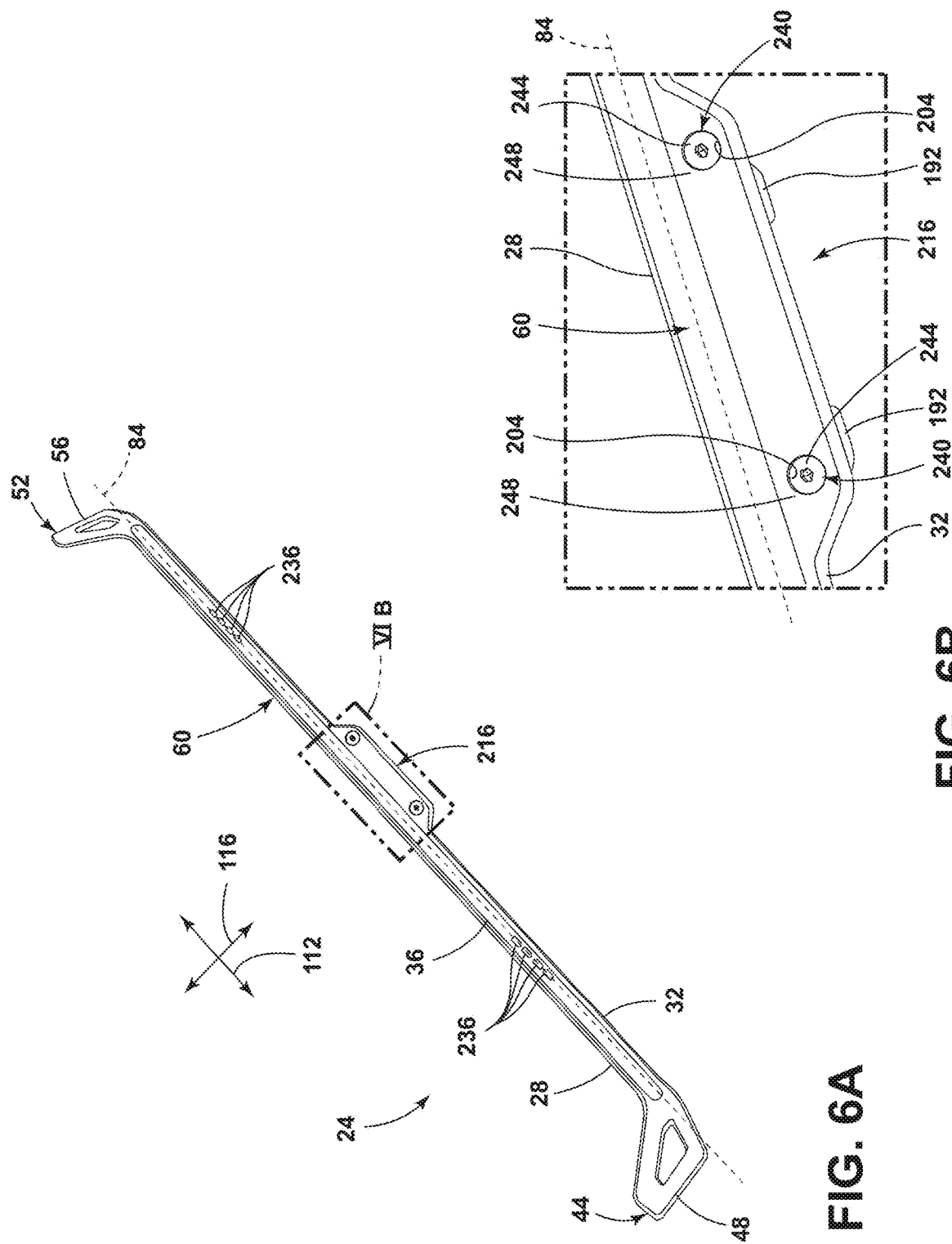
FIG. 6A is a top perspective view of the accessory mounting track, illustrating connectivity apertures, according to one example.
FIG. 6B is an expanded top perspective view, taken at region VIB of FIG. 6A, illustrating a central portion of the accessory mounting track, according to one example.
Figure 7:
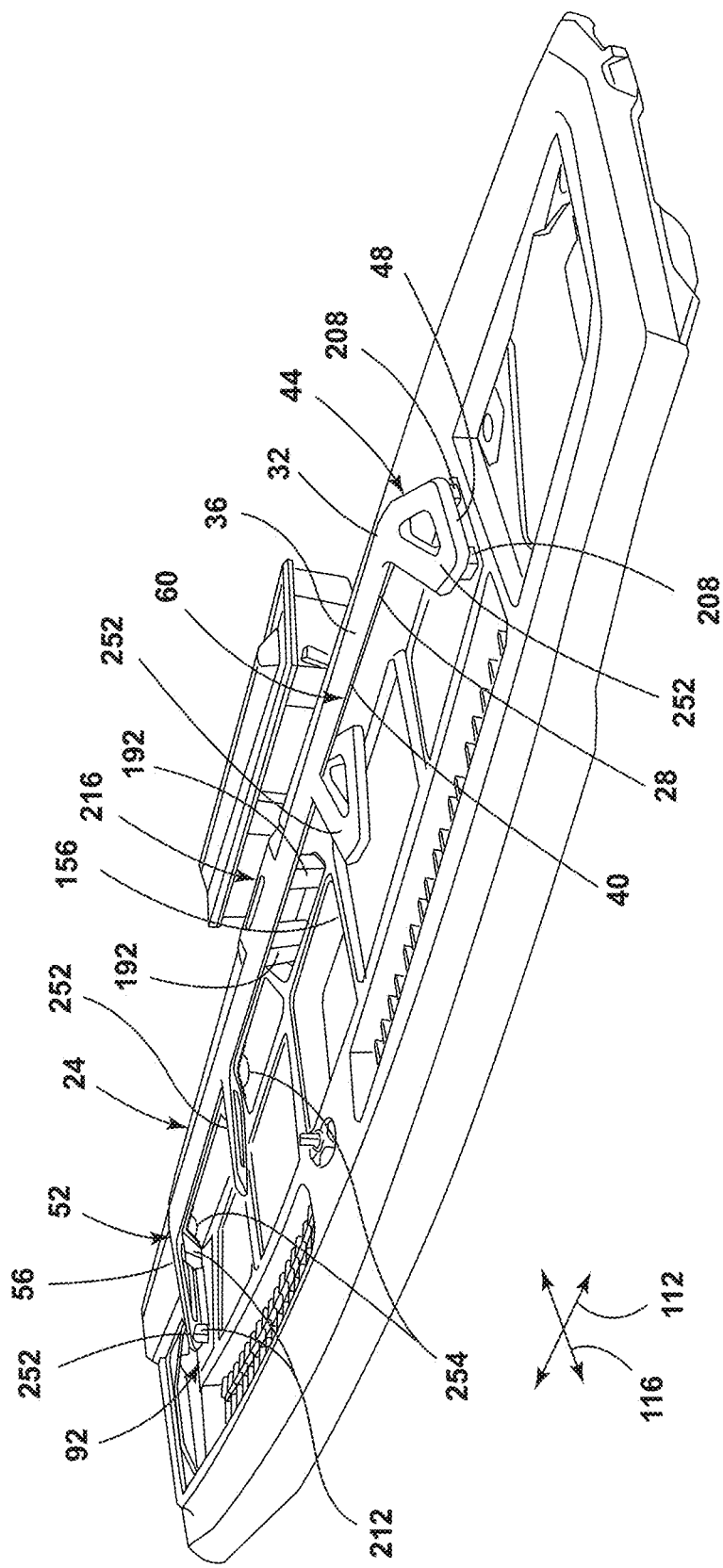
FIG. 7 is a front perspective view of the accessory mounting track, illustrating an interaction between the accessory mounting track and a top surface of the instrument panel, according to one example.
Figure 8:
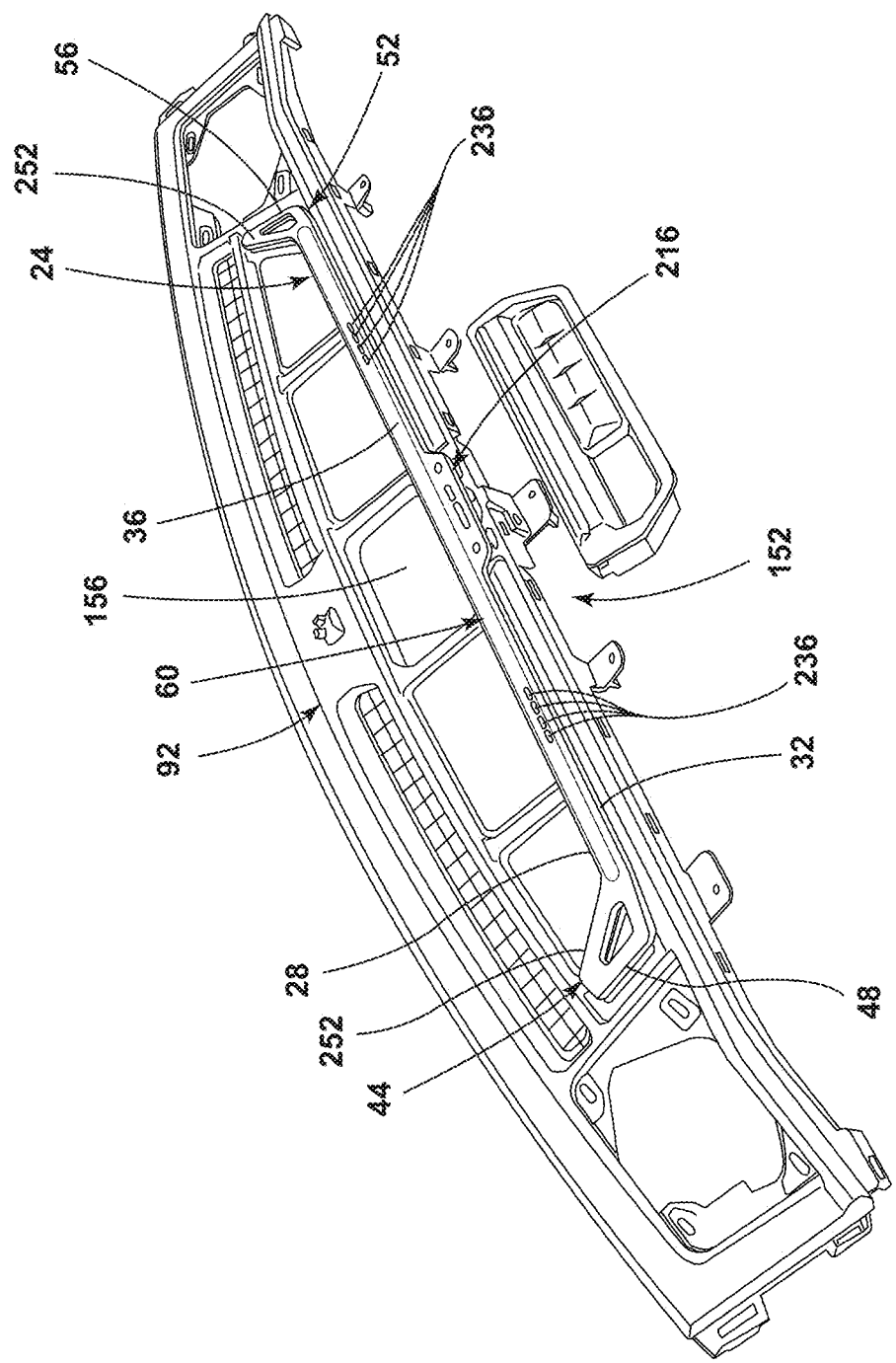
FIG. 8 is a top perspective view of the accessory mounting track, illustrating an interaction between the accessory mounting track and the top surface of the instrument panel, according to one example.
Figure 9:
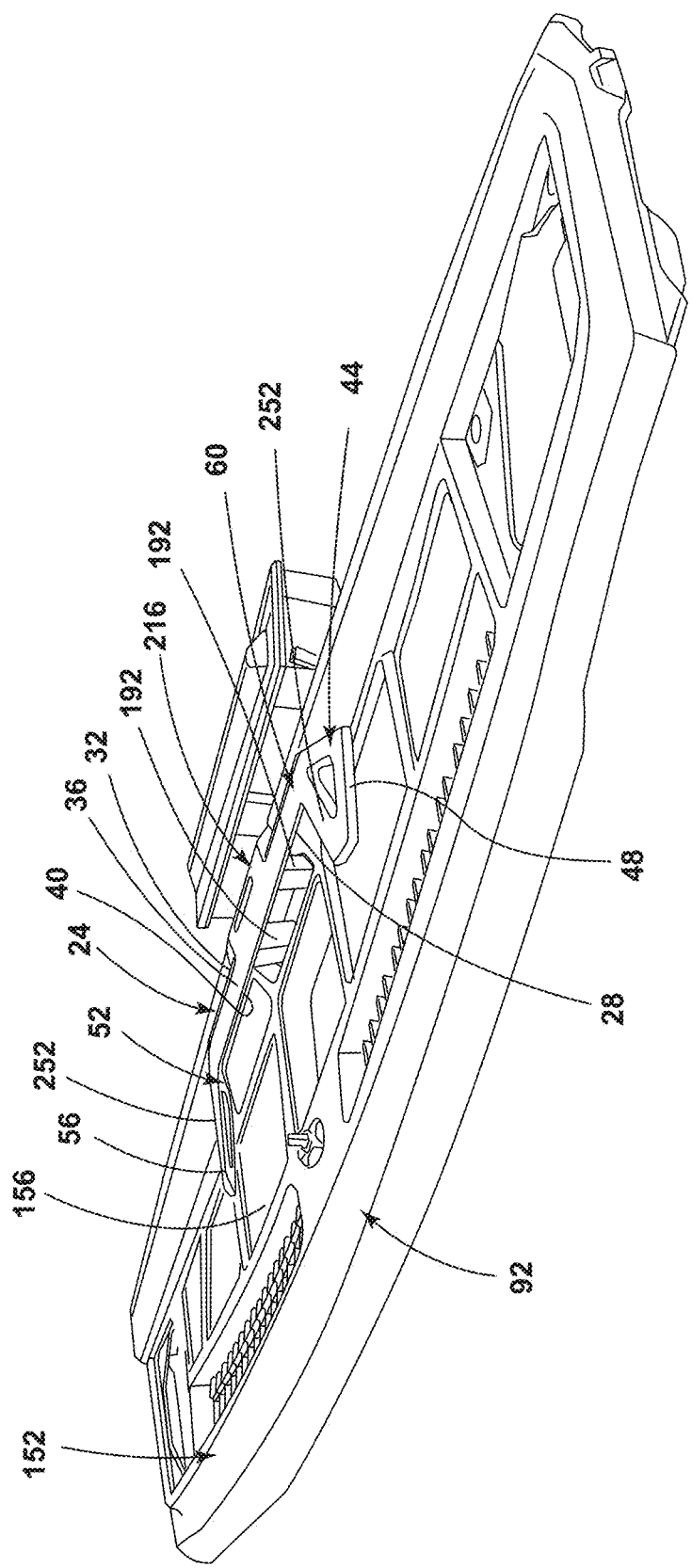
FIG. 9 is a front perspective view of the accessory mounting track, illustrating an interaction between the accessory mounting track and the top surface of the instrument panel, according to another example.
Figure 10:
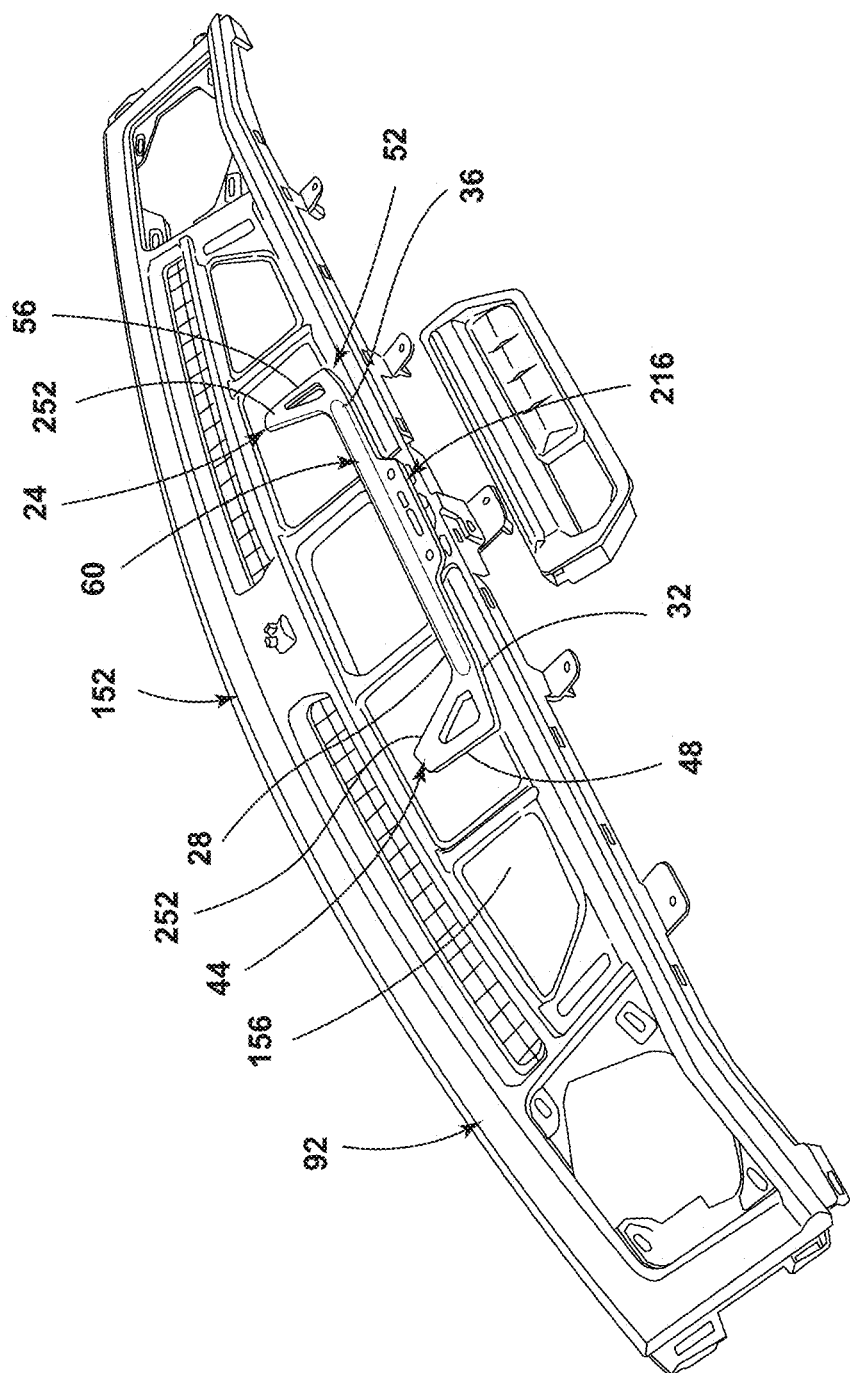
FIG. 10 is a top perspective view of the accessory mounting track, illustrating an interaction between the accessory mounting track and the top surface of the instrument panel, according to another example.

Referring now to FIGS. 6A-6B, the accessory mounting track 24 is shown with the intermediate region 60 as being featureless with regard to the ridges 132 and the valleys 136 (see FIG. 1) and the apertures 140 in an effort to enable a more clear depiction of features that will be discussed with regard to these figures. However, as outlined above, it is contemplated that the intermediate region 60 may be provided with the ridges 132 and/or the apertures 140. The intermediate region 60 may define connectivity apertures 236. The connectivity apertures 236 may be sized and/or positioned to correspond with one or more connectivity receptacles provided on the vehicle 20. For example, the connectivity receptacles may be vehicle accessory outlets, three-pronged electrical outlets, USB receptacles and/or any other suitable power and/or data transfer receptacle. By providing the connectivity apertures 236 along the accessory mounting track 24, a user may electrically couple the removable accessory 100 (e.g., smart phone 104 and/or mobile audio/visual recording device 108) to the vehicle 20. Accordingly, the removable accessory 100 may be provided with power to maintain a charge and/or operability of the removable accessory 100. Additionally or alternatively, the removable accessory 100 may receive data from the vehicle 20 and/or transmit data to the vehicle 20. In either instance, such an electrical coupling between the removable accessory 100 and the vehicle 20 may be accomplished in a manner that reduces a length of a corresponding connectivity cable that extends between the connectivity receptacles and the removable accessory 100 while preventing the shortened length of the connectivity cable from impeding actuation of the removable accessory 100 along the accessory mounting track 24. In examples where the presented surface 92 to which the accessory mounting track 24 is coupled is the top surface 156 of the instrument panel 152, maintaining the ability to actuate the removable accessory 100 along the accessory mounting track 24 while decreasing the length of the connectivity cable can prevent the connectivity cable(s) from becoming a hindrance to full enjoyment of the features provided on the instrument panel 152 and thereby provide a useful cable/cord management solution/approach.

Referring again to FIGS. 6A-6B, as discussed above, the central portion 216 of the intermediate region 60 may be provided with a greater distance between the forward edge 28 and the rearward edge 32 of the accessory mounting track 24. Such an arrangement of the central portion 216 may provide additional stability to the accessory mounting track 24 with regard to preventing unintentional rotational motion of the accessory mounting track 24 in the lateral direction 112 and/or the longitudinal direction 116. Additionally, such a configuration of the central portion 216 of the intermediate region 60 can enable providing the protruding members 192 (see FIG. 4) as offset from the centerline 84 of the intermediate region 60. By so positioning the protruding members 192, it is possible to couple one of the removable accessories 100 to the intermediate region 60 within the central portion 216 without interfering with the coupling of the accessory mounting track 24 to the vehicle 20. The central portion 216 defines the fastener aperture 204 that extends through the protruding members 192. The fastener aperture 204 receives a fastener 240 that extends through the protruding member 192 and engages with the support structure 164 and/or the presented surface 92 to which the accessory mounting track 24 is coupled. The fastener 240 can include a head 244 that engages with an upper region 248 of the central portion 216. As the fastener 240 is tightened (e.g., by threaded engagement with the support structure 164 and/or the presented surface 92), the head 244 of the fastener 240 may bear against the upper region 248 such that the accessory mounting track 24 is retained to the support structure 164 and/or the presented surface 92.

Referring to FIGS. 7-10, the accessory mounting track 24 is depicted as coupled to the presented surface 92. In the depicted example, the presented surface 92 is the top surface 156 of the instrument panel 152. The first end region 44 and the second end region 52 may define brace structures 252. The brace structures 252 may have a profile that is generally triangular in shape. However, it is contemplated that alternative geometries of the brace structures 252 are possible without departing from the concepts discussed herein. The intermediate region 60 of the accessory mounting track 24 may be generally parallel to the presented surface 92 to which the accessory mounting track 24 is coupled (e.g. the top surface 156 of the instrument panel 152). The brace structures 252 may be non-parallel to the presented surface 92 and the intermediate region 60. For example, the brace structures 252 may extend away from the intermediate region 60 toward the presented surface 92 at an angle 254 of at least about 10°, at least about 15°, at least about 20°, at least about 25°, at least about 30°, at least about 35°, at least about 40°, at least about 45°, at least about 50°, at least about 55°, at least about 60°, at least about 65°, at least about 70°, at least about 75°, at least about 80°, at least about 85°, about 90°, less than about 90°, and/or combinations or ranges thereof. The angular offset of the brace structures 252 relative to the intermediate region 60 may provide additional rigidity and/or support to the accessory mounting track 24 in the lateral direction 112 and/or the longitudinal direction 116.

Referring again to FIGS. 7-10, in various examples, the brace structures 252 may at least partially extend or cover the distance between the intermediate region 60 and the presented surface 92. In examples where the first and second standoffs 208, 212 are employed, a remainder of the distance between the intermediate region 60 and the presented surface 92 may be covered by the corresponding first standoff 208 and/or the second standoff 212 (see FIG. 7). It is contemplated that the accessory mounting track 24 may be provided in a long version (see FIGS. 6-7) and a short version (see FIGS. 9-10). In some examples, the long version of the accessory mounting track 24 may be provided with additional brace structures 252 that are positioned between the first end 48 and the central portion 216 and/or between the second end 56 and the central portion 216 (see FIG. 7). In such an example, the additional brace structures 252 that are positioned at intermediate locations along the intermediate region 60, the standoffs may be omitted. The brace structures 252 that are positioned at the intermediate locations along the intermediate region 60 may have the same or similar structures as those positioned at the first end region 44 and the second end region 52. Accordingly, the attributes discussed above with regard to the structure and arrangement of the first and second end regions 44, 52 may apply in whole or in part to the additional brace structures 252. In various examples where the short version of the accessory mounting track 24 is employed, the first and second standoffs 208, 212 may be omitted. In such examples, it is contemplated that rigidity provided by the intermediate region 60, as well as a decreased distance between the protruding members 192 and the first and second end regions 44, 52, may enable a decrease in a surface area of contact between the accessory mounting track 24 and the presented surface 92 such that the first and second standoffs 208, 212 may be omitted and the brace structure 252 may directly contact the presented surface 92 (e.g., continuous contact or intermittent contact based on load).

Figure 11A:
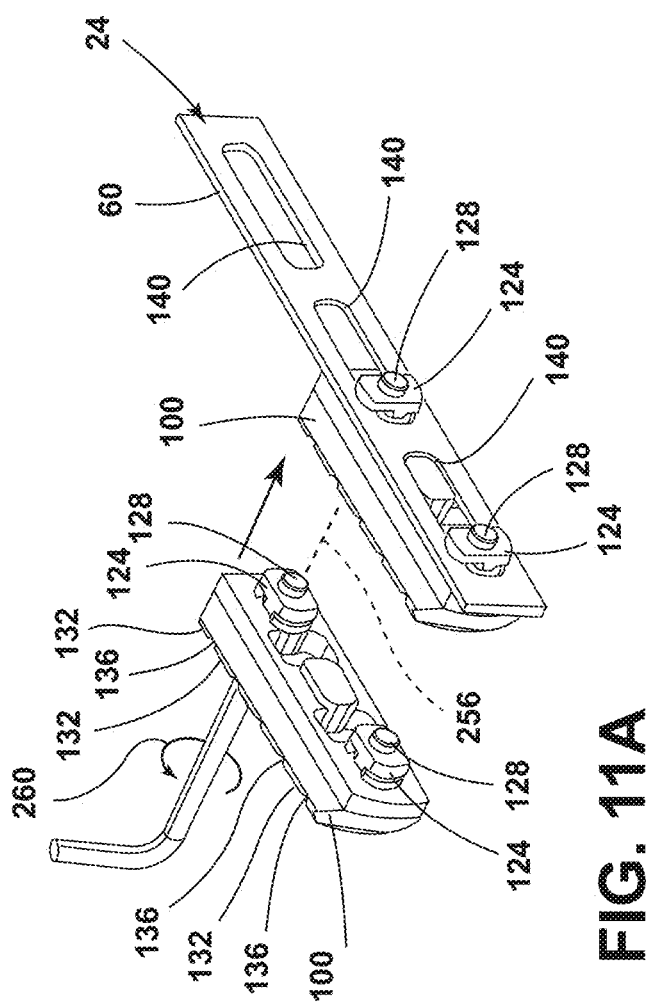
FIG. 11A is a bottom perspective view of an intermediate region of the accessory mounting track, illustrating a coupling arrangement, according to one example.
Figure 11B:
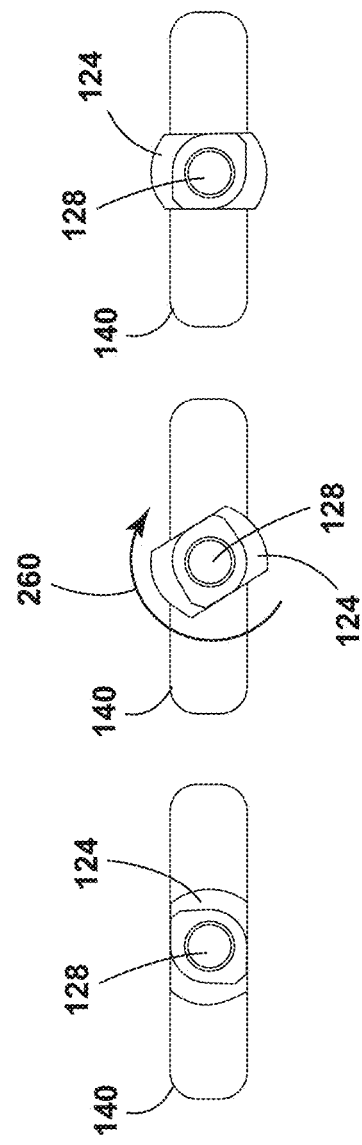
FIG. 11B is a bottom view of the apertures, illustrating a progression of a coupling between the apertures and a coupling member of a removable accessory, according to one example.

Referring now to FIGS. 11A-11B, the intermediate region 60 can define the apertures 140 that are configured to receive the coupling member 124 of the removable accessory 100. The coupling member 124 may include the accessory fastener 128. For example, the coupling member 124 may receive the accessory fastener 128. The accessory fastener 128 may be rotated about an axis 256 thereof as indicated by arrow 260. The rotation of the accessory fastener 128 about the axis 256 thereof can retain the removable accessory 100 in a given location along the intermediate region 60. In various examples, the rotation of the accessory fastener 128 about the axis 256 thereof may cause or induce the coupling member 124 to rotate from a first position to a second position (see progression depicted in FIGS. 11A and 11B). For example, as the accessory fastener 128 is rotated about the axis 256 thereof, the coupling member 124 may be transitioned from the first position, which may be a position in which the coupling member is generally parallel to the aperture 140, to the second position, where the coupling member 124 may be non-parallel to the aperture 140 (e.g., perpendicular). Upon accomplishing the transition from the first position to the second position of the coupling member 124, the accessory fastener 128 may be permitted to further rotate about the axis 256 thereof such that the accessory fastener 128 extends further through the coupling member 124 while the coupling member 124 may remain stationary relative to the accessory fastener 128 (e.g., maintaining the second position). In some examples, the removable accessory 100 that is coupled to the accessory mounting track 24 may be provided with the ridges 132 that define the valleys 136 such that the removable accessory 100 may be utilized as an adapter for the apertures 140 and the removable accessory 100 may receive an additional accessory (e.g., the smart phone 104, the mobile audio/visual recording device 108, or another additional accessory). Regardless of the identity or function of the removable accessory 100, upon coupling the removable accessory 100 to the accessory mounting track 24, the mounting structure 120 (e.g., the coupling member 124) of the removable accessory 100 may be adjacent to the lower surface 40 and the support surface (e.g., the presented surface 92) to which the accessory mounting track 24 is coupled.

Referring now to FIGS. 12A-12B, the intermediate region 60 of the accessory mounting track 24 is depicted with the ridges 132 that define the valleys 136 therebetween. Upon coupling the removable accessory 100 to the accessory mounting track 24, the mounting structure 120 of the removable accessory 100 is received within one or more of the valleys 136 such that the mounting structure 120 is retained by adjacent ones of the ridges 132 that define the one or more valleys 136. For example, the coupling member 124 can include protrusions 264 that define recesses 268 that are positioned between adjacent ones of the protrusions 264. The sizing and positioning of the protrusions 264 and the recesses 268 can correspond with the valleys 136 and the ridges 132, respectively. Accordingly, the engagement between the protrusions 264 and the valleys 136 can result in a retention of the coupling member 124 and the removable accessory 100 within a horizontal plane of the accessory mounting track 24 (e.g., the lateral direction 112 of the vehicle 20).

Referring again to FIGS. 12A-12B, the angular portions 64 of the intermediate region 60 can prevent rotational motion of the removable accessory 100 relative to the intermediate region 60. For example, as illustrated in phantom lines in FIG. 12A, the coupling member 124 of the mounting structure 120 may define angled regions 272 that flank or are positioned on either side of a planar region 276 (also see FIG. 1). The angled regions 272 in the planar region 276 are sized and positioned to be complementary and correspond with the angular portions 64 and the planar portion 68 of the intermediate region 60, respectively. In some examples, the angled regions 272 may be adjustable relative to the planar region 276. For example, at least one of the angled regions 272 may be adjustable relative to the planar region 276 such that a distance between the angled regions 272 may be increased and/or decreased (e.g., along the longitudinal direction 116 of the vehicle 20). Such adjustment may be accomplished by tightening and/or loosening the accessory fastener 128. The accessory fastener 128 may be loosened to an extent that allows the removable accessory 100 to be coupled to the intermediate region 60 of the accessory mounting track 24. Once the removable accessory 100 has been positioned such that the angled regions 272 and the angular portions 64 are aligned with one another, the accessory fastener 128 may be tightened to decrease a distance between the angular portions 64 and the angled regions 272. Physical contact may be made between the angled regions 272 and the angular portions 64 as a result of the continued tightening of the accessory fastener 128. Engagement between the protrusions 264 and the ridges 132, as well as the angled regions 272 and the angular portions 64, can result in retention of the mounting structure 120 of the removable accessory 100 in a vertical direction, a horizontal direction, the lateral direction 112, and/or the longitudinal direction 116. Accordingly, linear and/or rotational motion of the mounting structure 120 relative to the accessory mounting track 24 may be limited to prevent the removable accessory 100 from deviating from a desired location of the user. In some examples, the ridges 132, as well as the corresponding valleys 136, may be omitted from the intermediate region 60. In such an examples, the apertures 140 can be included and the interaction between the coupling member 124 and the accessory mounting track 24 when the accessory fastener 128 is tightened may provide retention that would have otherwise been provided by the interaction between the ridges 132 and the protrusions 264. In examples where the ridges 132 are omitted, the accessory mounting track 24 may include the angular portions 64. Accordingly, it is contemplated that hybrid structures of those disclosed herein may be employed without departing from the concepts disclosed herein. As shown in FIG. 12A, a cross-section within the intermediate region 60 of the accessory mounting track 24 may be oblong or defined by a major axis and a minor axis. Such an arrangement of the accessory mounting track 24, within the intermediate region 60 and/or elsewhere, can aid in the prevention of unintended rotational motion of the removable accessory 100 relative to the accessory mounting track 24.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. An accessory mounting track, comprising:
    a forward edge;
    a rearward edge;
    an upper surface;
    a lower surface;
    a first end region comprising a first end;
    a second end region comprising a second end; and
    an intermediate region positioned between the first and second end regions, wherein a cross-section of the intermediate region comprises an angular portion positioned on either side of a planar portion, wherein the planar portion and the angular portions are delineated by an inflection point at a junction between the planar portion and each of the angled portions, wherein a distance between the upper surface and the lower surface at the angular portions decreases as a distance from a centerline of the intermediate region increases, and wherein a distance between the forward edge and the rearward edge at the first and second end regions increases as a distance from the intermediate region increases.

2. The accessory mounting track of claim 1, wherein the intermediate region defines a series of apertures that receive a coupling member of a removable accessory.

3. The accessory mounting track of claim 2, wherein the coupling member receives an accessory fastener, and wherein the accessory fastener is rotated about an axis thereof to retain the removable accessory in a given location along the intermediate region.

4. The accessory mounting track of claim 3, wherein rotation of the accessory fastener causes the coupling member to rotate from a first position to a second position.

5. The accessory mounting track of claim 1, further comprising:
    a protruding member that extends from the lower surface.

6. The accessory mounting track of claim 5, wherein the protruding member defines a fastener aperture therethrough.

7. The accessory mounting track of claim 6, wherein the fastener aperture receives a fastener, and wherein the fastener engages with a support structure to retain the accessory mounting track to the support structure.

8. The accessory mounting track of claim 1, further comprising:
    a first standoff that extends from the lower surface within the first end region; and
    a second standoff that extends from the lower surface within the second end region.

9. The accessory mounting track of claim 1, wherein a viewing direction of a removable accessory is non-parallel to the centerline of the intermediate region.

10. The accessory mounting track of claim 1, wherein the angular portions of the intermediate region prevent rotational motion of a removable accessory relative to the intermediate region.

11. The accessory mounting track of claim 1, wherein the forward edge within the first and second end regions extends beyond the forward edge within the intermediate region.

12. The accessory mounting track of claim 1, wherein, upon coupling a removable accessory to the accessory mounting track, a mounting structure of the removable accessory is adjacent to the lower surface and a support surface to which the accessory mounting track is coupled.

13. The accessory mounting track of claim 1, wherein the intermediate region defines a series of ridges, and wherein adjacent ridges define valleys therebetween.

14. The accessory mounting track of claim 13, wherein, upon coupling a removable accessory to the accessory mounting track, a mounting structure of the removable accessory is received within one or more of the valleys such that the mounting structure is retained by adjacent ones of the ridges that define the one or more valleys.

15. An accessory mounting track, comprising:
a forward edge;
a rearward edge;
an upper surface;
a lower surface;
a protruding member that extends from the lower surface, wherein the protruding member defines a fastener aperture therethrough, and wherein the fastener aperture receives a fastener, and wherein the fastener engages with a support structure to retain the accessory mounting track to the support structure;
a first end region comprising a first end;
a first standoff that extends from the lower surface within the first end region;
a second end region comprising a second end;
a second standoff that extends from the lower surface within the second end region; and
an intermediate region positioned between the first and second end regions, wherein a cross-section of the intermediate region comprises an angular portion positioned on either side of a planar portion, wherein the planar portion and the angular portions are delineated by an inflection point at a junction between the planar portion and each of the angled portions, wherein a distance between the upper surface and the lower surface at the angular portions decreases as a distance from a centerline of the intermediate region increases, wherein a distance between the forward edge and the rearward edge at the first and second end regions increases as a distance from the intermediate region increases, and wherein the forward edge within the first and second end regions extends beyond the forward edge within the intermediate region.

16. The accessory mounting track of claim 15, wherein the intermediate region defines a series of apertures that receive a coupling member of a removable accessory.

17. The accessory mounting track of claim 16, wherein the coupling member receives an accessory fastener, and wherein the accessory fastener is rotated about an axis thereof to retain the removable accessory in a given location along the intermediate region.

18. The accessory mounting track of claim 17, wherein rotation of the accessory fastener causes the coupling member to rotate from a first position to a second position.

19. The accessory mounting track of claim 15, wherein a viewing direction of a removable accessory is non-parallel to the centerline of the intermediate region.

20. The accessory mounting track of claim 15, wherein the intermediate region defines a series of ridges, and wherein adjacent ridges define valleys therebetween.

* * * * *